(12) United States Patent
Kabasakalian et al.

(10) Patent No.: US 6,745,211 B2
(45) Date of Patent: Jun. 1, 2004

(54) METHOD AND SYSTEM FOR VERIFYING AND CORRECTING DATA RECORDS IN A DATABASE

(75) Inventors: Gregory J. Kabasakalian, Ridgefield, CT (US); Evanthia E. Euripides, Mineral, VA (US); Aditya Srivastava, Uttar Pradesh (IN); Ajay Poddar, Morristown, NJ (US)

(73) Assignee: GE Financial Assurance Holdings, Inc., Richmond, VA (US)

( * ) Notice: Subject to any disclaimer, the term of this patent is extended or adjusted under 35 U.S.C. 154(b) by 15 days.

(21) Appl. No.: 09/683,121

(22) Filed: Nov. 21, 2001

(65) Prior Publication Data

US 2003/0097349 A1 May 22, 2003

(51) Int. Cl.[7] .............................................. G06F 17/30
(52) U.S. Cl. ..................................................... 707/204
(58) Field of Search ............................. 707/100, 104.1, 707/103 Y, 6, 204, 200, 102

(56) References Cited

U.S. PATENT DOCUMENTS

| | | | | |
|---|---|---|---|---|
| 5,329,447 A | * | 7/1994 | Leedom, Jr. ................... | 705/9 |
| 5,440,738 A | * | 8/1995 | Bowman et al. ............... | 707/6 |
| 5,608,874 A | * | 3/1997 | Ogawa et al. ............... | 709/246 |
| 5,764,972 A | * | 6/1998 | Crouse et al. ................. | 707/1 |
| 5,794,250 A | * | 8/1998 | Carino et al. ................. | 707/9 |
| 5,966,519 A | * | 10/1999 | Keeley .......................... | 716/5 |
| 6,091,846 A | * | 7/2000 | Lin et al. .................... | 382/145 |
| 6,112,304 A | * | 8/2000 | Clawson ...................... | 713/156 |
| 6,188,766 B1 | * | 2/2001 | Kocher ........................ | 380/246 |
| 6,489,968 B1 | * | 12/2002 | Ortega et al. ............... | 345/713 |

* cited by examiner

Primary Examiner—Safet Metjahic
Assistant Examiner—Sana Al-hashemi
(74) Attorney, Agent, or Firm—Hunton & Williams LLP (57) ABSTRACT

The invention provides a method and system for verifying a data record. An unverified data record is read. A reference data file containing reference data records, the reference data records being associated with verified data records, is provided. The unverified data record is compared with the reference data records to identify a matching reference data record. The matching reference data record is read to identify a matching verified data record. The matching verified data record is outputted.

13 Claims, 10 Drawing Sheets

METHOD AND SYSTEM FOR VERIFYING AND CORRECTING DATA RECORDS IN A DATABASE

FIELD OF THE INVENTION

This invention relates generally to a method and system for verifying and correcting records in a database.

BACKGROUND OF THE INVENTION

Databases have become a cornerstone in the handling of information in today's society. Everyone from major corporations, to small business, to schools and governments use databases to store, manage and track large amounts of information. The information comes in the form of data records, each having fields containing data. However, the utility of a database is only as good as the information contained therein. It becomes the responsibility of a database manager, for example, to ensure that the information contained in the database is accurate, such that a user can reasonably rely on the information gathered from the database.

Many companies in the service and product industry, for example, use databases to track orders, sales and transactions on a daily basis. These companies typically document daily transactions by placing a data record in the database describing each transaction. Often, companies rely on these transactional data records to determine which employee in the company is responsible for a given transaction. The accuracy of the transactional information becomes especially important for the employee working on commission or bonus credit.

A potential difficulty that arises in the management of database systems is errors that occur in manual data entry. Often, database systems receive input information from many different users and sources. This large number of participants greatly increases the likelihood of an error. Illustratively, a simple missed keystroke by one individual responsible for the data entry could drastically change what the data was supposed to represent.

One industry affected by errors in data entry is mutual fund administration. Fund managers process several thousand transactions daily. Illustratively, some mutual funds may handle more than 80,000 transactions daily. These transactions include purchase orders for stocks in a fund or requests for asset information. Each transaction must be recorded and stored in a database for reporting purposes. The large volume of daily transactions dramatically increases the opportunity for error in the data entry.

An error in data entry can have a serious impact on the administration of a database and those who rely on its information. Many database managers utilize information collected in a database to make business decisions or choices about a given response to data information.

In mutual fund administration, data entry errors present the additional difficulty of tracking the correct individual responsible for a given customer's business. The manager must ensure that the salesperson who filled the customer's needs receives credit and compensation for providing the service to both the customer and the fund. The difficulty, however, becomes compounded by the volume of daily transactions processed and the numerous transaction sources that represent different brokerage houses, branches, brokers, traders and salespersons, for example.

Illustratively, assume that a data entry representative makes a simple error in typing in transaction information by transcribing numbers representing a given fund broker The mistake may cause a broker in Los Angeles to receive credit for a transaction closed by a dealer in New York City. Unless the fund administrator can provide a system that verifies that errors such as this do not occur, brokers working on commission will recognize these problems and may avoid engaging in business for that particular fund.

Utilizing conventional techniques, manual verification of data entered manually into a database is often necessary. This may require that an employee of the mutual fund spend valuable time double-checking and investigating information for inaccurate transactional data.

Accordingly, conventional techniques for ensuring that data placed into and contained in known database systems do not provide an adequate method and system of verifying the data contained therein.

SUMMARY OF THE INVENTION

It is therefore desirable that the invention overcome these and other drawbacks of present systems and methods. Thus, there is a need to provide a method and system for verifying data records that are to be placed into a database, as well as for correcting inaccurate data records already contained in a database.

In accordance with one embodiment of the methods and systems of the invention, an unverified data record is read. A reference data file containing reference data records is provided. The reference data records are associated with verified data records. The unverified data record is compared with the reference data records to identify a matching reference data record. The matching reference data record is read to identify a matching verified data record. The matching verified data record is then output.

In a further aspect of the invention a system is provided for verifying a data record, the system comprising a data record reader portion that reads an unverified data record; a reference data file memory that contains at least one reference data file containing reference data records, the reference data records being associated with verified data records; a data record comparison portion that compares the unverified data record with the reference data records to identify a matching reference data record; a data record verification portion that reads the matching reference data record to identify a matching verified data record; and a data record output portion that outputs the matching verified data record.

In a further aspect of the invention a method of verifying a data record is provided, the method comprising reading an unverified data record; providing a reference data file containing reference data records, the reference data records including verified reference data records and unverified reference data records, the verified reference data records being associated with a respective matching verified data record, the unverified reference data records not being associated with a respective matching verified data record; comparing the unverified data record with the reference data records to identify a matching reference data record; reading the matching reference data record to identify a matching verified data record; and outputting the matching verified data record.

In a further aspect of the invention, a system is provided for verifying a data record, the system comprising a data record reader portion that reads an unverified data record; a reference data file memory that contains at least one reference data file containing reference data records, the reference data records including verified reference data records and unverified reference data records, the verified reference data records being associated with verified data records, the unverified reference data records not being associated with verified data records; a data record comparison portion that compares the unverified data record with the reference data records to identify a matching reference data record; a data record verification portion that reads the matching reference data record to identify a matching verified data record; and a data record output portion that outputs the matching verified data record.

In a further aspect of the invention, a system is provided comprising means for reading an unverified data record; means for comparing the unverified data record with reference data records, the reference data records being associated with verified data records; means for associating the unverified data record with a matching reference data record, the matching reference data record being associated with a matching verified data record; and means for outputting the matching verified data record.

In a further aspect of the invention, a system is provided for verifying a data record, the system comprising means for reading an unverified data record; means for providing a reference data file containing reference data records, the reference data records including verified reference data records and unverified reference data records, the verified reference data records being associated with a respective matching verified data record, the unverified reference data records not being associated with a respective matching verified data record; means for comparing the unverified data record with the reference data records to identify a matching reference data record; means for reading the matching reference data record to identify a matching verified data record; and means for outputting the matching verified data record.

BRIEF DESCRIPTION OF THE DRAWINGS

The present invention can be more fully understood by reading the following detailed description of the presently preferred embodiments together with the accompanying drawings, in which like reference indicators are used to designate like elements, and in which.

DETAILED DESCRIPTION OF THE INVENTION

In accordance with an embodiment of the method and system of the invention, a method of verifying a data record comprises the steps of reading an unverified data record; providing a reference data file containing reference data records, the reference data records being associated with verified data records; comparing the unverified data record with the reference data records to identify a matching reference data record; reading the matching reference data record to identify a matching verified data record; and outputting the matching verified data record.

Figure 1:
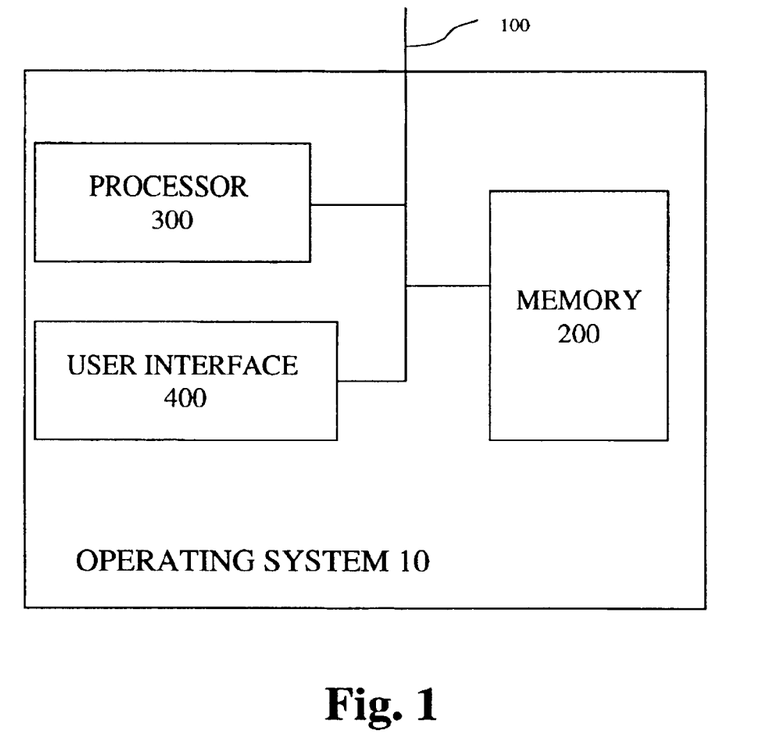
FIG. 1 is a block diagram showing an illustrative operating system in accordance with an embodiment of the method and system of the invention.

Reference will now be made in detail to an exemplary embodiment of the invention. FIG. 1 is a block diagram showing an illustrative operating system in accordance with an embodiment of the method and system of the invention. As shown in FIG. 1, the operating system 10 includes memory portion 200, processor portion 300, and user interface portion 400. A suitable communications path may be utilized to allow communication between the components of the operating system 10. Accordingly, as shown in FIG. 1, an interface 100 allows the memory portion 200, processor portion 300, and user interface portion 400 to communicate with each other.

Figure 2:
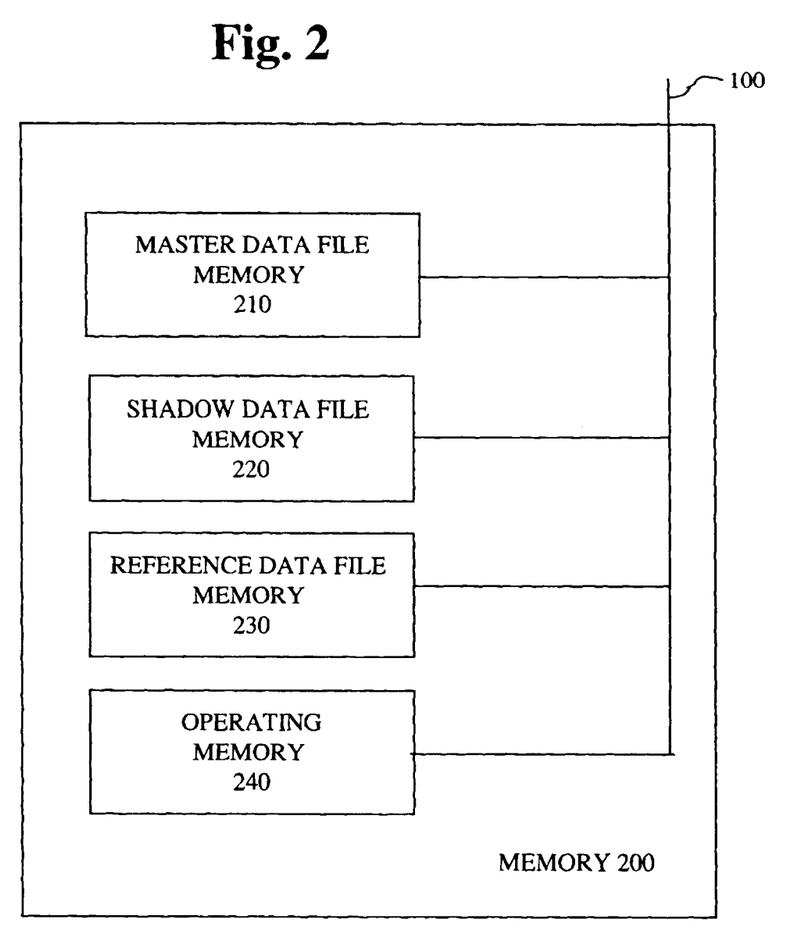
FIG. 2 is a block diagram showing the memory portion of FIG. 1 in further detail in accordance with an embodiment of the method and system of the invention.

FIG. 2 illustrates the memory portion 200 of FIG. 1 in further detail in accordance with an embodiment of the method and system of the invention. The memory portion 200 includes a master data file memory 210, a shadow data file memory 220, a reference data file memory 230, and an operating memory 240.

In one embodiment, the master data file memory 210, shadow data file memory 220 and reference data file memory 230 represent related data files, or tables, in a relational database system. A relational database system allows information contained in different tables to be accessed and shared. However, the relational database provides the additional advantage that changes, updates or amendments to data information in one table of a relational database affects that same information in any other table utilizing it. A table is a collection of several data records with similar data information fields. Data records represent a collection of data that is organized into fields. The fields may also be formatted to receive data of varying types such as alphanumeric, numeric or simple characters. Accordingly, the database user can view data records in a user interface, input or edit the data contained in the various fields, or issue a database query that retrieves and reports information from multiple tables.

Figure 4:
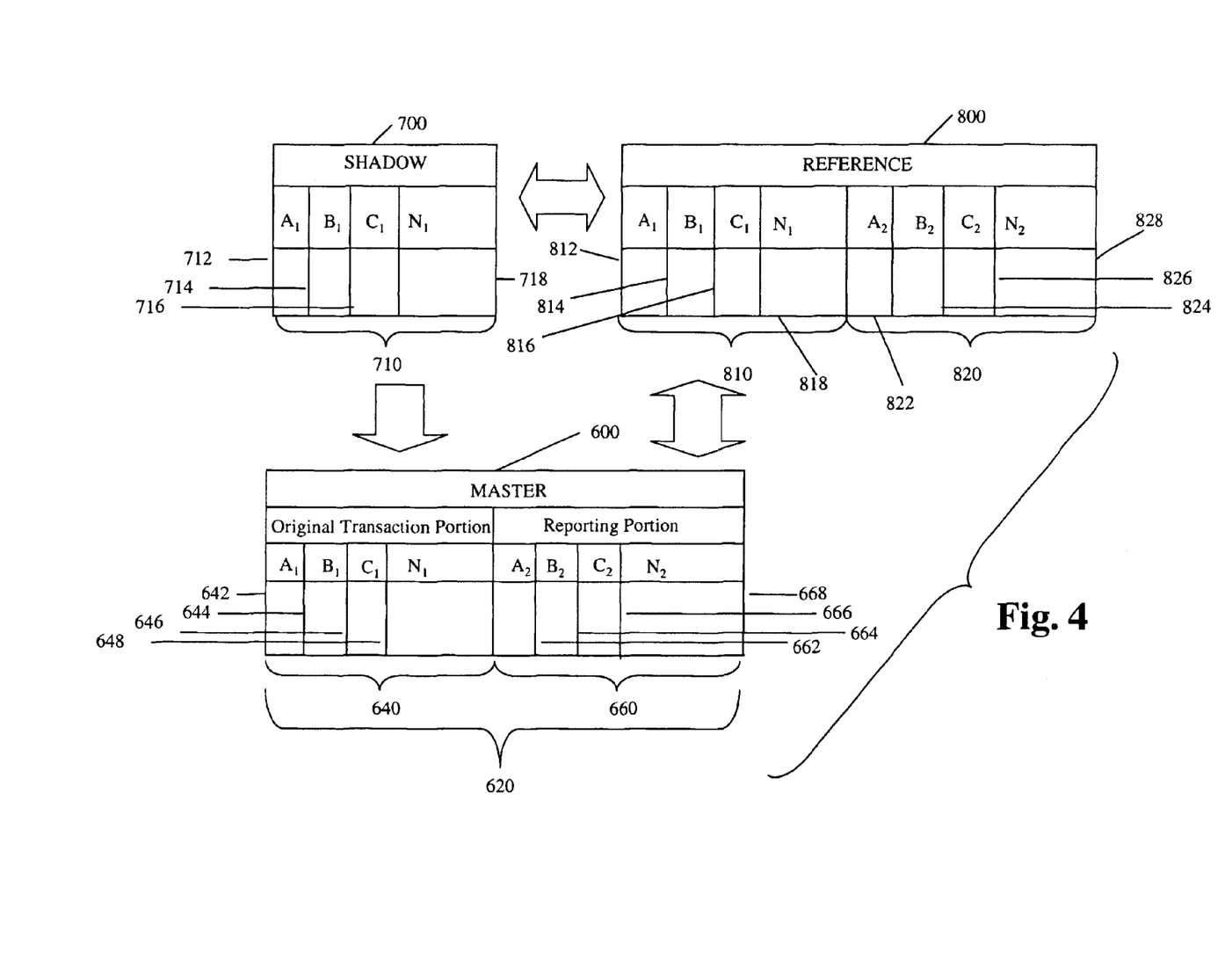
FIG. 4 is an illustrative system of tables in accordance with an embodiment of the method and system of the invention.

Accordingly, the master data file memory 210 holds master data records, each having an original transaction portion and a reporting portion. Both the original transaction portion and reporting portion are formatted to receive data from data records in the relational database system. In operation, shadow data information is placed in the original transaction portion of an empty master data record, while the reporting portion is populated with verified data information found in the reference data file memory. Reference may be made to FIG. 4, which is also described in further detail below.

A master data record that has data in its original transaction portion but does not have verified data in its reporting portion may be characterized as an unresolved master data record. The shadow data information in the original transaction portion of an unresolved master data record may still be referred to as an unverified data record. Once an unresolved master data record receives verified data information in its reporting portion, the data information in the original transaction is no longer an unverified data record and the unresolved master data record is now resolved. It should be appreciated that data contained in the original transaction and reporting portion may be considered a data record in and of itself.

It should further be appreciated that each data record in this system has at least one identifier field that may contain identifier data. The identifier data is used by the system to associate various data records in the database and identify the source of the transactional data information that makes up the data record. Furthermore, each data record may include more than one identifier field. The skilled artisan should be able to determine the necessary number of identifier fields necessary to practice the invention based on the needs of the given database system.

Furthermore, the shadow data file memory 220 holds shadow data records, each having fields formatted to receive data from input flat files. Shadow data records are also herein characterized as unverified data records. In addition, the reference data file memory 230 holds reference data records and verified data records, wherein each reference data record may be associated with a verified data record. It should be appreciated that not all reference data records will be associated with a verified data record, and those non-associated reference data records are known as unverified reference data records. A reference data record containing identifier data matching the identifier data in the identifier fields of an unverified data record is known as the unverified data record's matching reference data record. Additionally, a verified data record that has been associated with a reference data record is known as a matching verified data record. When a reference data record is associated with a verified data record, it should be understood that the identifier data in the reference data record has been verified. If the identifier data in the reference data record was incorrect, the accurate identifier data in the matching verified data record should be correct and will be outputted to the reporting portion of the corresponding matching data record.

Thus, it should be appreciated that an unverified data record may describe either a shadow data record from the shadow data file memory 220 or the data contained in the original transaction portion of an unresolved master data record. Again, the unresolved master data record has data information only in its original transaction portion and does not have verified data in its reporting portion.

According to this embodiment of the invention, a suitable processor receives an input flat file from a data source outside the relational database system, parses the data information contained on the input flat file, and places the data information into shadow data records in the shadow data file memory 220. Each shadow data record has identifier fields containing identifier data that is compared to similar data found in each reference data record in the reference data file memory 230. When a reference data record with matching identifier data is identified, the matching reference data record is checked to see if it is associated with a verified data record, i.e., a matching verified data record. If so, the data information from the shadow data record is placed into the original transaction portion of an empty master data record, and the data from the matching verified data record is copied into the reporting portion of the same empty master data record. It should be appreciated that even if a shadow data record does not match a reference data record on the reference data file memory, or a matching reference data record does not have a matching verified data record, the data from the shadow data record is still placed into the original transaction portion of an empty master data record in the master data file memory 210.

According to another embodiment of the invention, the system compares the data in the original transaction portion of an unverified master data record to the reference data records in the reference data file memory. The system examines the identifier data in the original transaction portion of the unresolved master data record to identify if any reference data record has matching identifier data. If a matching reference data record is identified, the system checks to see if the matching reference data record is associated with a verified data record, i.e., a matching verified data record. If so, the system copies the data from the matching verified data record into the reporting portion of the unresolved master data record. The system performs this preferably after a new association is made in the reference data file memory 230 between a reference data record and a verified data record, creating a new matching verified data record.

In addition, operating memory 240 may include exception reports generated in the method of the invention. These exception reports may list all unverified data records or unresolved master data records, or both. The exception reports serve to alert the database administrator of those data records that could not be verified for accuracy and require correction. The operating memory 240 may further include general reports detailing information contained in all the tables in the relational database system.

Figure 3:
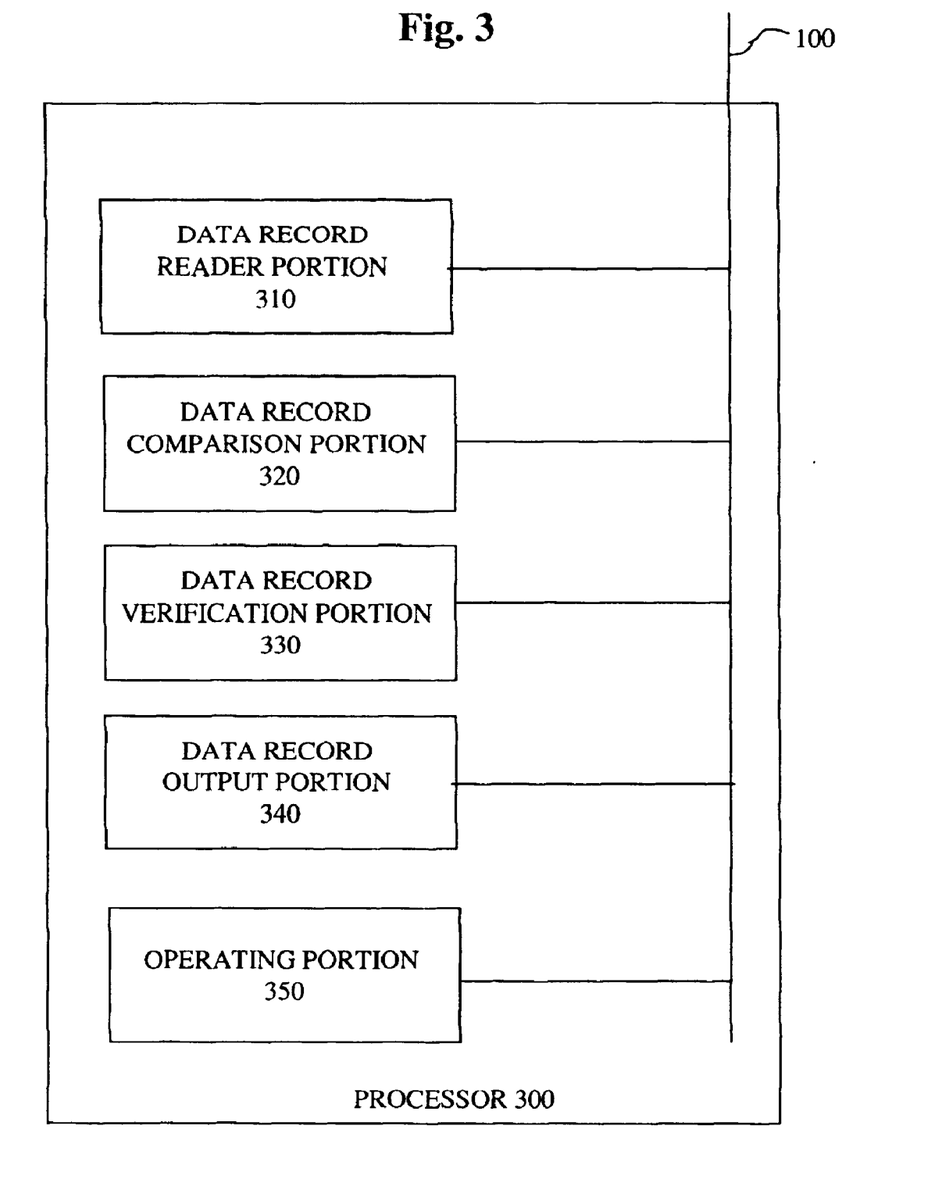
FIG. 3 is a block diagram showing the processor portion of FIG. 1 in further detail in accordance with an embodiment of the method and system of the invention.

FIG. 3 shows the processor portion of FIG. 1 in further detail in accordance with one embodiment of the method and system of the invention. The processor portion 300 includes a data record reader portion 310, a data record comparison portion 320, a data record verification portion 330, a data record output portion 340, and an operating portion 350.

According to one embodiment of the invention, the data record reader portion 310 reads an unverified data record. The data record comparison portion 320 then compares the unverified data record with the reference data records, that are contained in reference data files in the reference data file memory 230, to identify a matching reference data record. Once a matching reference data record is identified, the data record verification portion 330 identifies any matching verified data record associated with the matching reference data record. Finally, the data record output portion 340 outputs the matching verified data record to the master data file memory 210.

Illustratively, the data record reader portion 310 scans an unverified data record from the shadow data file memory 220 or the master data file memory 210. The data record comparison portion 320 compares the identifier data contained in the unverified data record's identifier fields with the reference data records in the reference data file memory 230. More specifically, the data record comparison portion 320 compares the unverified data record's identifier data with the identifier data in the reference data records to determine whether there is matching identifier data in the respective identifier fields.

If a reference data record with matching identifier data cannot be found, the operating portion 350 places a new reference data record, matching the unverified data record, in the reference data file memory 230. The new reference data record is known as an unverified reference data record because it does not yet have a matching verified data record. Further, in accordance with one embodiment of the methods and systems of the invention, the operating portion 350 may generate an exception report for each unverified reference data record. Alternatively, if the data record comparison portion 320 does identify a reference data record with matching identifier data, that reference data record is known as the unverified data record"s matching reference data record.

Consequently, if the unverified data record has a matching reference data record, the data record verification portion 330 scans the matching reference data record and determines if the matching reference data record has been associated with a verified data record, i.e. the matching verified data record. If not, the matching reference data record is an unverified reference data record. It should be appreciated that if an unverified data record does not have a matching reference data record, and consequently, a new reference data record was placed in the reference data file memory, there cannot be a matching verified data record for the reference data record until the user creates one and associates it with the matching reference data record.

When a matching verified data record is identified, the data record output portion 340 outputs a copy of the data contained in the matching verified data record to the reporting portion of the associated master data records. This occurs irrespective of whether the master data records is an empty master data records receiving data from a shadow data record simultaneously, or the master data records is an unresolved master data records.

FIG. 4 shows an illustrative system of tables 20 in accordance with one embodiment of the method and system of the invention. The system 20 represents the interaction of the tables in a database used in verifying a data record in a database. The system of tables 20 includes master table 600, shadow table 700, and reference table 800.

The master table 600 includes master data record 620 with an original transaction portion 640 and a reporting transaction portion 660. The original transaction portion 640 includes identifiers fields 642, 644 and 646, and transaction data portion 648. The identifier fields 642, 644, 646 may each contain identifier data respectively. The reporting portion 660 includes identifier fields 662, 664 and 666, and transaction data portion 668. The identifier fields 662, 664 and 666, may each contain identifier data, respectively.

It should be appreciated that each portion of the master data record 620 may include additional or fewer identifier fields, with the understanding that each portion must contain at least one identifier field. One of ordinary skill in the art would have knowledge of the necessary number of identifier fields needed to practice the invention based on the skilled artisan"s individual database needs. The number of identifier fields chosen by the skilled artisan will preferably be used in every data record in the system. This includes the original transaction portion and reporting portion of each master data record, each shadow data record, reference data record and verified data record in the master data file memory 210, the shadow data file memory 220, and the reference data file memory 230. Accordingly, it should be appreciated that each unverified data record, reference data record and verified data record preferably have the same number of identifier fields, as well as the original transaction portion and reporting portion of each master data records.

Transaction data portions 648 and 668 may include data information representing a transaction. Illustratively, this data information may include broker dealer number, branch number, representative number, new broker dealer number, new branch number, new representative number, new representative name, broker name, broker address and zip code, state code and name, channel code and name, fund description, fund class, fund code, subscriptions, redemptions, neutrals, customer social security number, address and contact information, or customer payment information, for example.

The shadow table 700 includes shadow data record 710. Shadow data record 710 includes identifier fields 712, 714, 716, and transaction data portion 718. It should be appreciated that shadow data records in the shadow table do not contain any data in their fields until the processor places data there accordingly. Therefore, if new input is placed into shadow data record 710, identifier fields 712, 714, 716 may each contain identifier data, respectively. The transaction data portion 718 may include data information describing mutual fund activity. Illustratively, this data information may represent broker dealer number, branch number, representative number, new broker dealer number, new branch number, new representative number, new representative name, broker name, broker address and zip code, state code and name, channel code and name, fund description, fund class, fund code, subscriptions, redemptions, neutrals, customer social security number, address and contact information, customer payment information, for example.

The reference table 800 includes reference data record 810, which may be associated with verified data record 820. The reference data record 810 includes identifier fields 812, 814, 816, and data portion 818. Verified data record 820 includes identifier fields 822, 824, 826 and transaction data portion 828. While each reference data record may be associated with a verified data record, it should be appreciated that this may not be the case. Thus the reference data record may not be associated with a verified data record, i.e. a matching verified data record. It should be understood that a verified data record will not be in the reference table 800 unless it is associated with a reference data record.

It should be appreciated that each table is set up to receive any suitable number of data records to practice the invention. Illustratively, at its inception, each table could include several empty data records, that would be populated as the method of the invention proceeds.

According to a further embodiment, the system may begin without any verified data records in the reference table 800. In such an embodiment, the invention creates a new matching reference data record each time an unverified data record was compared against the reference data records in the reference table 800. These reference data records would be unverified reference data records in that they would not yet have a matching verified data record. Therefore, as new verified data records are added to the reference table 800 and associated with unverified reference data records, the system of the invention checks these new verified data records against the original transaction portions of unresolved master data records in the master table 600. This allows the database system to verify information contained in the unresolved master data records after it has already been placed in the master table 600.

Figure 5:
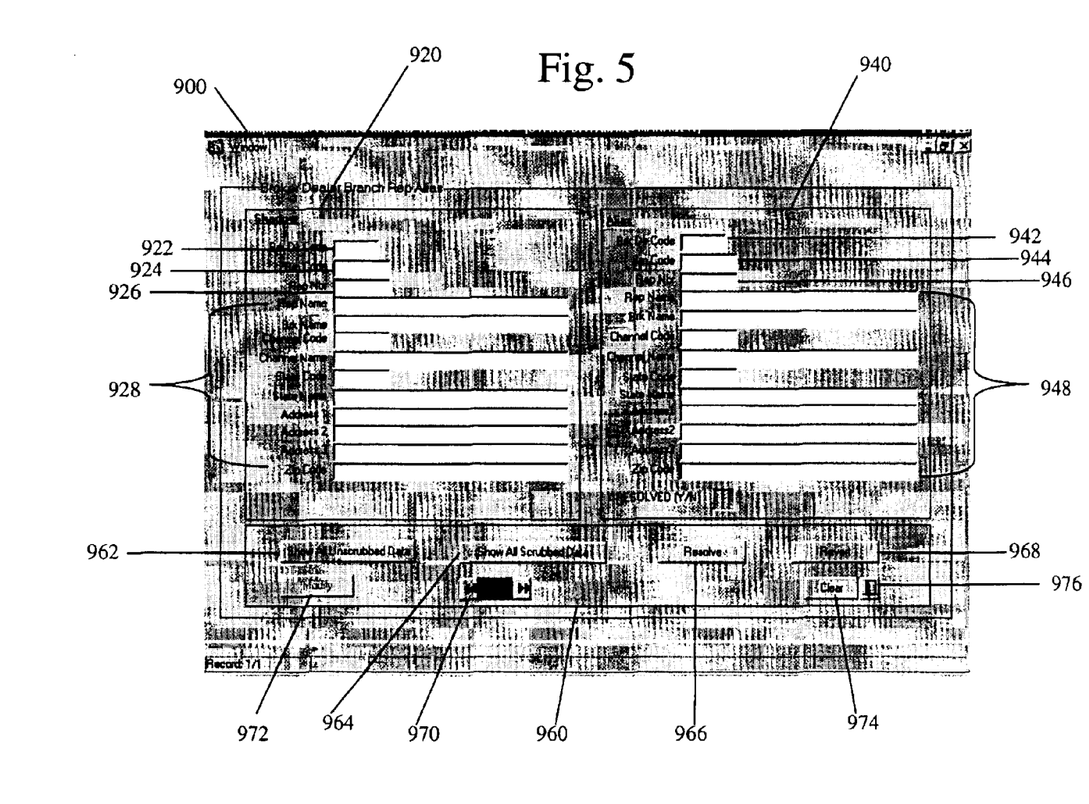
FIG. 5 is an illustrative graphic user interface illustrating a database maintenance form in accordance with an embodiment of the method and system of the invention.

FIG. 5 is an illustrative graphic user interface illustrating a database maintenance form 900 in accordance with one embodiment of the method and system of the invention. This form 900 may be used to view data records, tables and information in the system, or create, modify or undo associations between reference data records and verified data records. The form 900 includes a reference data record portion 920, a verified data record portion 940, and an operation portion 960.

Additionally, the reference data record portion 920 includes identifier fields 922, 924, 926, which may contain identifier data, and transactional portion 928. The verified data record portion 940 includes identifier fields 942, 944, 946, which may contain verified identifier data, and transactional portion 948. The operating portion 960 includes user tools for viewing data records, tables and information in the system, or creating, modifying or undoing associations between reference data records and verified data records.

Accordingly, the user may input verified identifier data into the identifier fields 942, 944, 946 in the verified data record portion 940 and associate the data with a reference data record in the reference data record portion 920. Essentially, when data is entered into the identifier fields and the user selects the resolve button 966 from operating portion 960, the user has associated the verified data record with the reference data record. The selection of the resolve button 966 may force the system to recheck unresolved master data records.

The operating portion 960 may also include tools for showing each reference data record. For example, the operating portion 960 may include a unverified reference tool 962 for displaying the unverified reference data records, i.e. those reference data records without a matching verified data record, on a user interface. A reference tool 964 may allow the user to display verified reference data records, i.e. those reference data records with a matching verified data record, on a user interface.

Furthermore, the operating portion 960 may include a revert button 968, which provides a tool for undoing an association between a reference data record and a verified data record. As described above, for a relational database correcting or undoing an association in one table updates all tables using that information. The revert button 968 also allows the form user to correct identifier data in the reference table and in the master table simultaneously.

The operating portion 960 may further include a modify button 972 that allows the form user to modify data information in an existing relationship between a reference data record and its matching verified data record. The operating portion 960 may also include a record selection tool 970 for scanning through each record in the system, allowing the user to move forward to the next data record or move back to see the previously viewed data record. A clear button 974 may also be provided that allows the form user to clear information typed into either the reference portion 920 or verified data record portion 940, or both. Alias button 976 allows the form user to obtain a blank database maintenance form 900, while at the same time remaining with the database system. Thus, selecting the alias button 976 brings a fresh database maintenance form 900 to the user interface for receiving input from the database user.

It should be appreciated that the database maintenance form may be used to change information contained throughout the entire database system. For example, selecting the resolve button 966 may create a relationship between a reference data record and verified data record that affects information throughout the system. Following the same logic, modifying a relationship using the modify button 972 can change information for that relationship in every table connected in the relational database.

Figure 6:
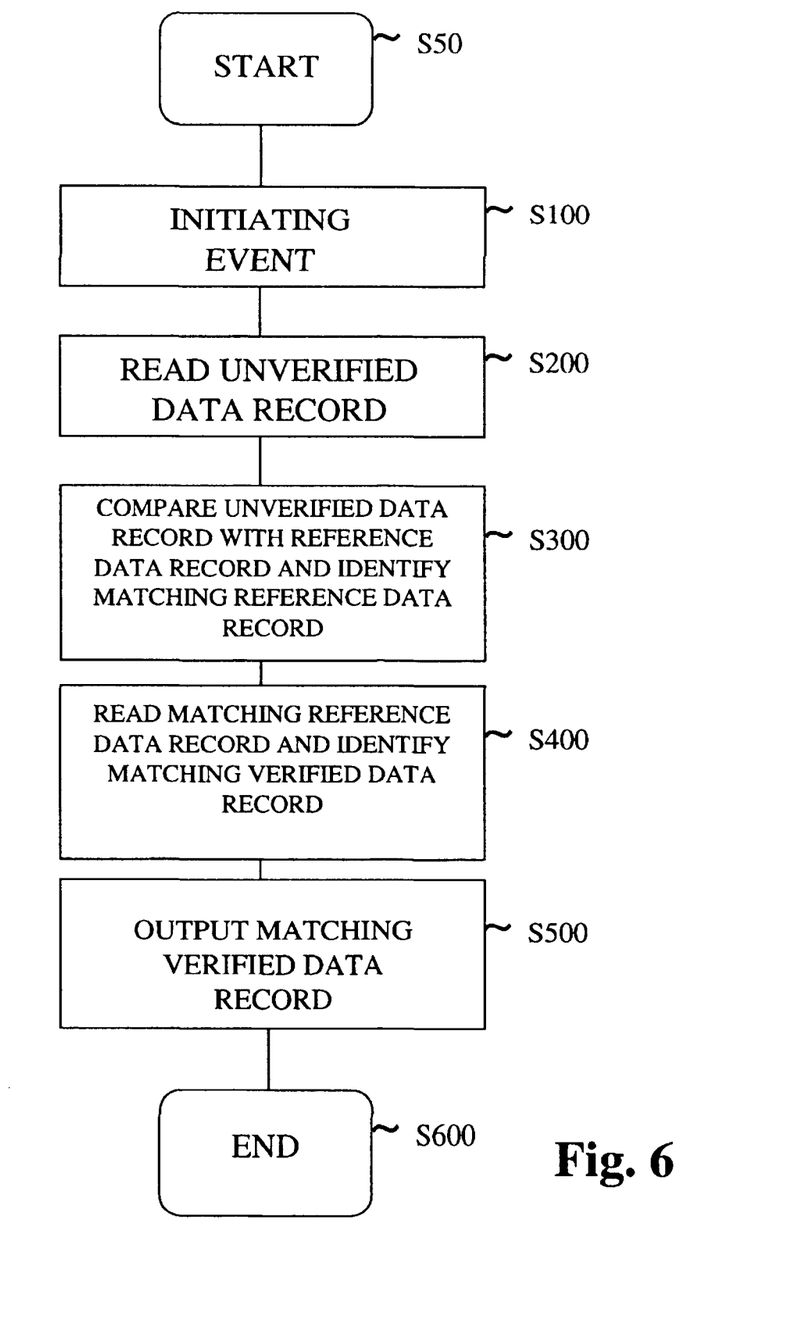
FIG. 6 is a flowchart illustrating the steps of a method of verifying a data record in accordance with an embodiment of the method and system of the invention.

FIG. 6 is a flowchart showing a method of verifying a data record in accordance with an embodiment of the method and system of the invention. As shown in FIG. 6, the invention begins with step S50. Then, in step S100 there is an initiating event. In step S200, an unverified data record is read. In step S300, the unverified data record is compared to a list of reference data records, and a matching reference data record is identified. In step S400, the matching reference data record is read and a matching verified data record is identified. Then, in step S500, the invention outputs the matching verified data record. The process ends in step S600.

Figure 7:
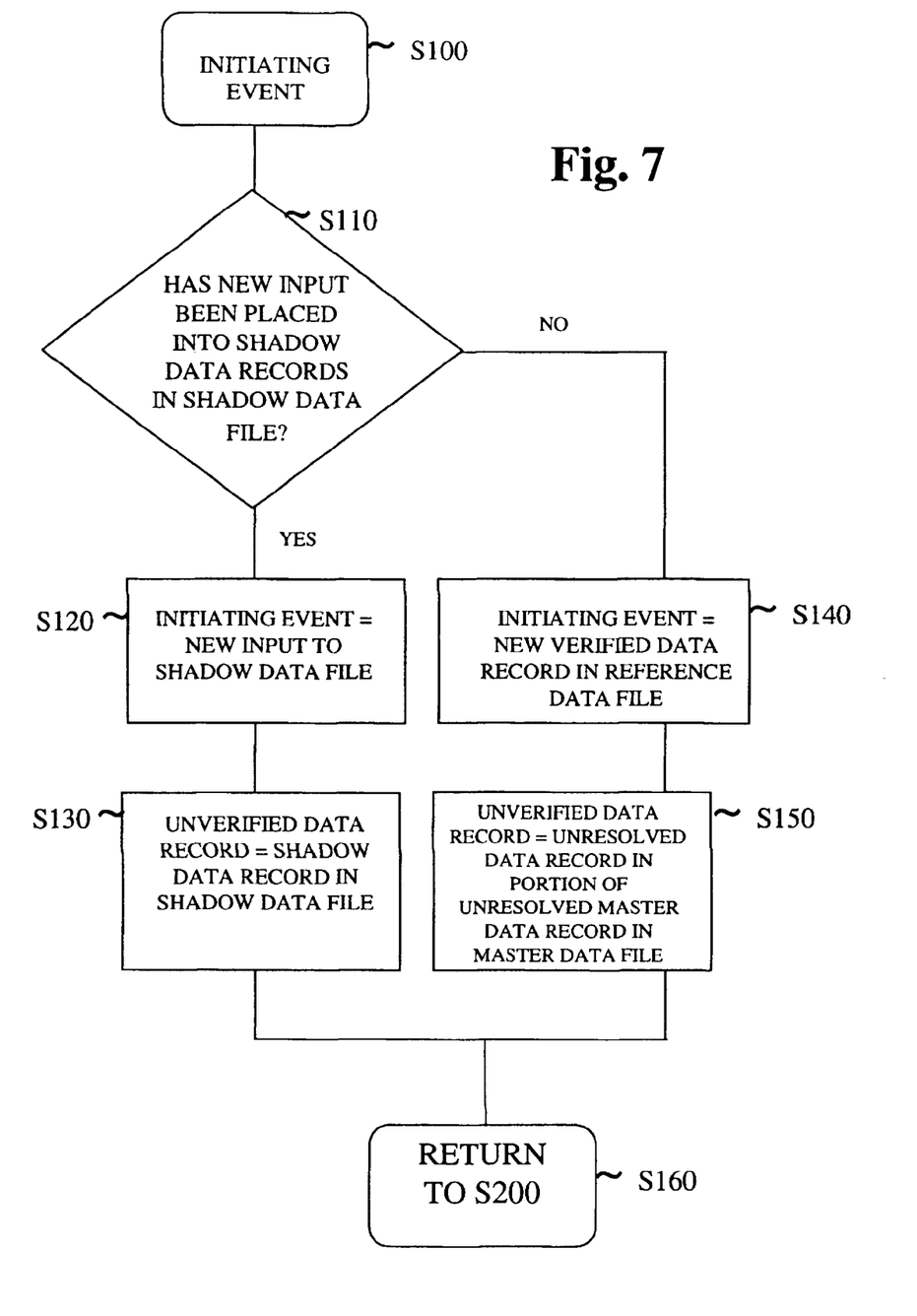
FIG. 7 is a flowchart illustrating the "initiating event" step of FIG. 6 in further detail in accordance with an embodiment of the method and system of the invention.

FIG. 7 is a flowchart showing the "initiating event" step of FIG. 6 in further detail in accordance with an embodiment of the method and system of the invention. In step S110, the method first determines whether new input has been placed into shadow data records in a shadow data file. If yes, as shown in step S120, the initiating event is when the new input has been placed in a shadow data file in shadow data records. According to this embodiment of the method and system of the invention, as shown in step S130, the unverified data record is a shadow data record contained in the shadow data file.

If the initiating event is not due to new input in the shadow data file, the initiating event is when a new verified data record has been placed in the reference data file, as shown in step S140. However, according to this embodiment of the method and system of the invention, as shown in step S150, the unverified data record is an unresolved data record from the original transaction portion of an unresolved master data record.

It should be appreciated that varying events may lead to the operation of the method and system of the invention. For example, new input to the shadow data file may include only one new shadow data record, or it may include several thousand new shadow data records. The method of verifying data records in the shadow data file begins when the shadow data file is presented for input to a master data file. However, the method and system of the invention may operate on task scheduling and request information from the shadow data file in batches, or periodically check the shadow data file to determine if new input has arrived from an outside source.

Furthermore, it should be appreciated that a new verified data record placed in the reference data file may involve filling in correct identifier data for a reference data record and associating the new verified data record with the reference data record. In addition, the new verified data record may involve modifying data in a verified data record, and once again associating the verified data record with a reference data record. Furthermore, placing a new verified data record on the reference data file may involve undoing the creation of a verified data record and the association between the previously verified data record and a reference data record.

It should be appreciated that when the creation of a verified data record is undone, and the association between the verified data record and a matching reference data record is removed, the user may undo the outputting of the verified data record to all of the master data records containing the verified data record. In essence, when the verified data record is modified or removed all together, the user is presented with the option of undoing the input of the verified data record in all the master data records where the verified data record was placed as a result of the invention.

Figure 8:
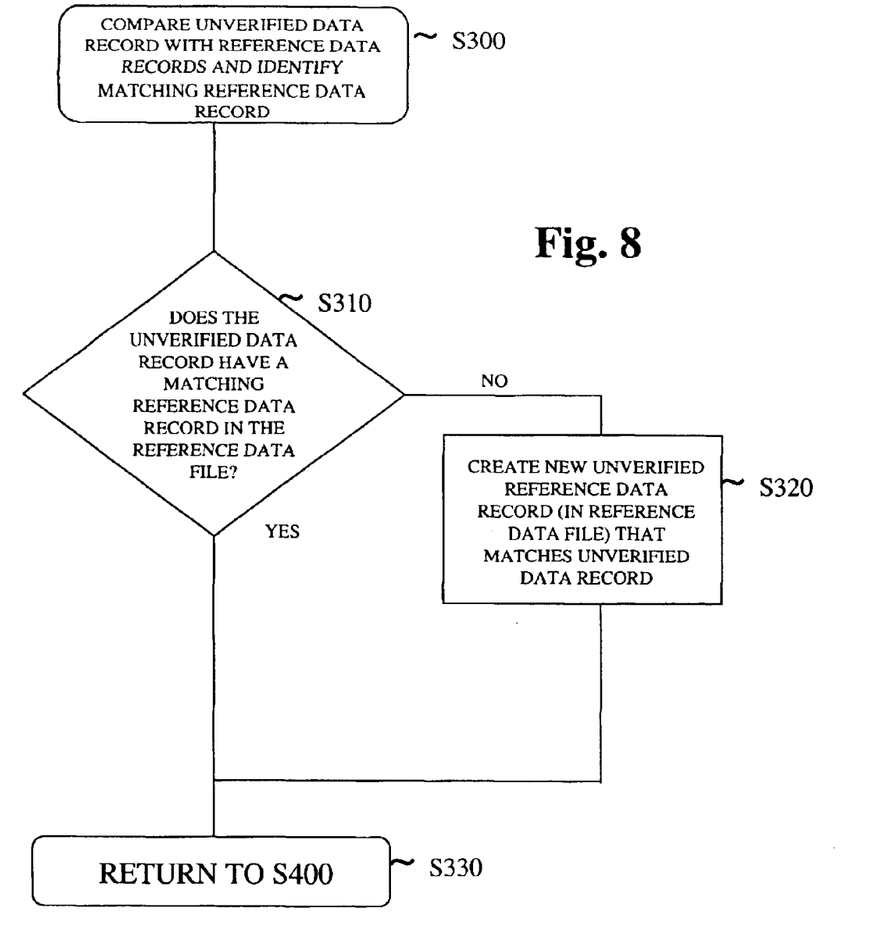
FIG. 8 is a flowchart illustrating the "compare unverified data record with reference data records and identify matching reference data record" step of FIG. 6 in further detail in accordance with an embodiment of the method and system of the invention.

FIG. 8 is a flowchart showing the "compare unverified data record with reference data records and identify matching reference data record step" of FIG. 6 in further detail in accordance with an embodiment of the method and system of the invention. As shown in FIG. 8, the process begins in step S300, and then passes to step S310. In step S310, the process determines whether the unverified data record has a matching reference data record in the reference data file. if yes, the process passes to step S330. If no, the process passes to step S320, in which a new unverified reference data record is placed in the reference data file, the new unverified reference data record matching the unverified data record. After step S320, the process also passes to step S330. In step S330, the process returns to step S400.

Figure 9:
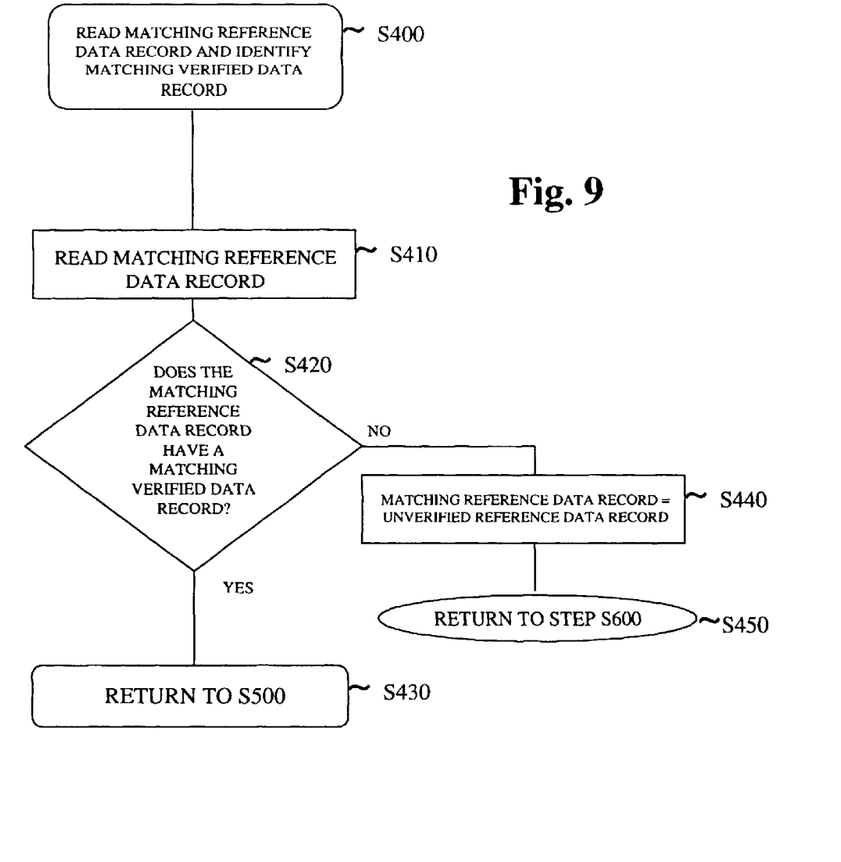
FIG. 9 is a flowchart illustrating the "read matching reference data record and identify matching verified data record" step of FIG. 6 in further detail in accordance with an embodiment of the method and system of the invention.

FIG. 9 is a flowchart showing the "read matching reference data record and identify matching verified data record step" of FIG. 6 in further detail in accordance with an embodiment of the method and system of the invention. The process begins in step S400, and then passes to step S410. In step S410, the process reads the matching reference data record identified in step S310. Then, in step S420, the process determines whether the matching reference data record is associated with a matching verified data record. If yes, the process passes to step S430, in which the process returns to step S500.

Alternatively, if in step S420, the process determines that the matching reference data record is not associated with a matching verified data record, the process passes to step S440, which identifies the matching reference data record as an unverified reference data record. The process then passes to step S450, in which the process jumps to step S600.

Figure 10:
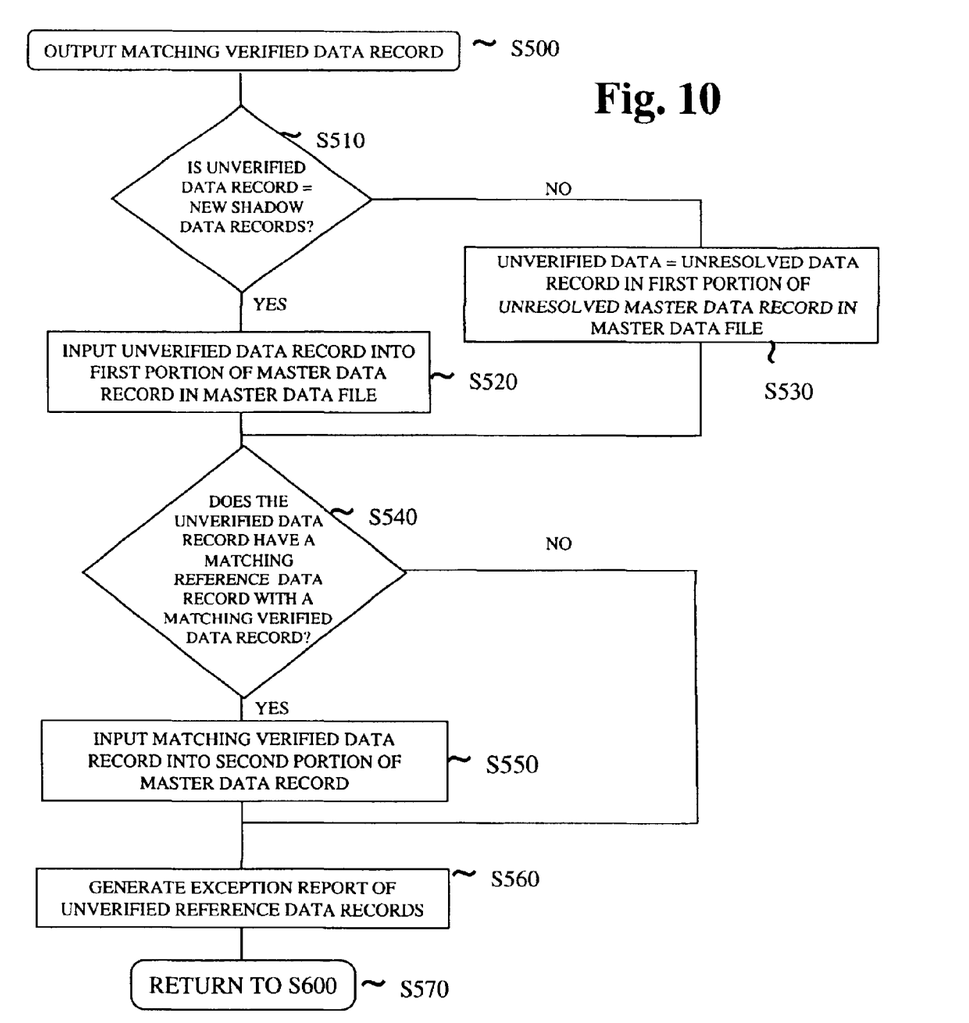
FIG. 10 is a flowchart illustrating the "output matching verified data record" step of FIG. 6 in further detail in accordance with an embodiment of the method and system of the invention.

FIG. 10 is a flowchart showing the "output matching verified data record" step of FIG. 6 in further detail in accordance with an embodiment of the method and system of the invention. The process begins in step S500, and passes to step S510. In step S510, the process determines whether the unverified data record being examined in the process is a new shadow data record. If yes, the process passes to step S520. In step S520, the unverified data record is placed into the original transaction portion of an empty master data record in the master data file. Then, the process passes to step S540.

It should be appreciated that when the unverified data record is placed into the original transaction portion of a master data record in the master data file, the process is copying the data from the fields of the unverified data record and placing the copied data into corresponding fields in the original transaction portion of the master data record. The original transaction portion of the master data record may be characterized as a first portion of the master data record Alternatively, if in step S510, the process determines that the unverified data record being examined in the process is not a new shadow data record, the process passes to step S530. In step S530, the process identifies that the unverified data record is an unresolved data record from the original transaction portion of an unresolved master data record, and passes to step S540.

Then, in step S540, the process determines whether the unverified data record has a matching reference data record, identified in step S310, which has a matching verified data record, identified in step S420. If yes, the process passes to step S550. In step S550, the matching verified data record is input into the reporting portion of the master data record, which may be characterized as a second portion of the master data record, containing the unverified data record in its original transaction portion. Then, the process passes to step S560. Alternatively, if the process determines that the unverified data record does not have a matching reference data record, which has a matching verified data record, the process passes directly to step S560.

It should be appreciated that when the matching verified data record is placed into the reporting portion of the master data record containing the unverified data record in its original transaction portion in the master data file, the process is copying the data from the fields of the matching verified data record and placing the copied data into corresponding fields in the reporting portion of the master data record.

In step S560, the process generates an exception report of unverified reference data records in the reference data file. In accordance with one embodiment of the methods and systems of the invention, the operating portion 350 may generate the exception report for each unverified reference data record. Then, the process passes to step S570, in which the process returns to step S600. As shown in FIG. 1, the process ends in step S600.

It should be appreciated that the process may also generate an exception report of unresolved master data records, i.e. master data records with data in the original transaction portion and no data in the reporting portion. This exception report of unresolved master data records may be in addition to the exception report generated in step S560, or in place of it.

It is understood that the present invention may be practiced by adding additional steps to the method, omitting steps within the process, and/or altering the order in which the steps are performed in the process.

As described above, the system and method of the invention utilizes a user interface to interact with a human user. As used herein, a user interface includes any software, hardware or combination of hardware and software used in an operating system that allows a user to interact with the operating system. For example, a user interface may include any of a touch screen, keyboard, mouse, voice reader, voice recognizer, dialogue screen, menu box, a list, a checkbox, a toggle switch, a pushbutton or any other component that allows a user to receive information regarding the operation of the operating system and/or provide the operating system with information. Accordingly, the user interface is any device that provides communication between a user and the operating system. The information provided by the user to the operating system through the user interface may be in the form of a command, a selection, data, or other input, for example.

It should be appreciated that FIGS. 1–3 above illustrate an exemplary operating system. However, other operating systems that perform the method of the invention, as described further below with reference to FIGS. 4–5 and 6–10, may also be utilized. Further, it is to be appreciated that to practice the system and method of the invention, it is not necessary that an operating processor and/or the memory be physically located in the same place. That is, it should be appreciated that each of the processor and the memory may be located in geographically distinct locations and connected so as to communicate in any suitable manner, such as over a network, for example. Additionally, it should be appreciated that each of the processor and/or the memory may be composed of different physical pieces of equipment.

Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations. Further, the memory could include or utilize memory stores from an Internet, Intranet, Extranet, LAN or some other source or over some other network, as may be necessary or desired.

As described above, the invention may illustratively be embodied in the form of a computer or computer operating system. It is to be appreciated that the software that enables the computer operating system to perform the operations described herein may be supplied on any of a wide variety of data holding media. Further, it should be appreciated that the implementation and operation of the invention may be in the form of computer code written in any suitable programming language, which provides instructions to the computer.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method or verifying a data record, comprising:
   reading an unverified data record;
   providing a reference data file containing reference data records, the reference data records being associated with verified data records;
   comparing the unverified data record with the reference data records to identify a matching reference data record;
   reading the matching reference data record to identify a matching verified data record; and
   outputting the matching verified data record; and
   the reference data file further including unverified reference data records, the unverified reference data records not being associated with a matching verified data record;
   further including comparing the unverified data record with the reference data records to identify unmatched unverified data records, the unmatched unverified data records being unverified data records that do not have a matching reference data record;
   further including the step of generating an unverified reference data record in the reference data file that matches each unmatched unverified data record; and
   further including the step of generating an exception report for each unverified reference data record; and
   wherein the unverified data record is a shadow data record in a shadow data file.

2. A method of verifying a data record, comprising:
   reading an unverified data record;
   providing a reference data file containing reference data records, the reference data records being associated with verified data records;
   comparing the unverified data record with the reference data records to identify a matching reference data record;
   reading the matching reference data record to identify a matching verified data record; and
   outputting the matching verified data record; and
   the reference data file further including unverified reference data records, the unverified reference data records not being associated with a matching verified data record;
   further including comparing the unverified data record with the reference data records to identify unmatched unverified data records, the unmatched unverified data records being unverified data records that do not have a matching reference data record;
   further including the step of generating an unverified reference data record in the reference data file that matches each unmatched unverified data record; and
   further including the step of generating an exception report for each unverified reference data record; and
   wherein the step of reading an unverified data record includes reading a shadow data record from a shadow data file.

3. The method of claim 2, wherein the step of outputting the matching verified data record includes:
   accessing an empty master data record in a master data file, the master data record including at least a first portion and a second portion;
   inputting the unverified data record into the first portion of the master data record; and
   inputting the matching verified data record into the second portion of the master data record.

4. A method of verifying a data record, comprising:
   reading an unverified data record;
   providing a reference data file containing reference data records, the reference data records being associated with verified data records;
   comparing the unverified data record with the reference data records to identify a matching reference data record;
   reading the matching reference data record to identify a matching verified data record; and
   outputting the matching verified data record; and
   the reference data file further including unverified reference data records, the unverified reference data records not being associated with a matching verified data record;
   further including comparing the unverified data record with the reference data records to identify unmatched unverified data records, the unmatched unverified data records being unverified data records that do not have a matching reference data record;
   further including the step of generating an unverified reference data record in the reference data file that matches each unmatched unverified data record; and
   further including the step of generating an exception report for each unverified reference data record; and
   wherein the unverified data record is an unresolved data record in an unresolved master data record in a master data file.

5. A method of verifying a data record, comprising:
   reading an unverified data record;
   providing a reference data file containing reference data records, the reference data records being associated with verified data records;
   computing the unverified data record with the reference data records to identify a matching reference data record;

reading the matching reference data record to identify a matching verified data record; and outputting the matching verified data record; and the reference data file further including unverified reference data records, the unverified reference data records not being associated with a matching verified data record;

further including comparing the unverified data record with the reference data records to identify unmatched unverified data records, the unmatched unverified data records being unverified data records that do not have a marching reference data record;

further including the step of generating an unverified reference data record in the reference data file chat matches each unmatched unverified data record; and further including the step of generating an exception report for each unverified reference data record; and wherein the step of reading an unverified data record includes reading an unresolved data record from a first portion of an unresolved master data record.

6. The method of claim 5, wherein the step of outputting the matching verified data record, further includes:

accessing the unresolved master data record; and inputting the matching verified data record into a second portion of the unresolved master data record that does not contain the unresolved data record.

7. A method of verifying a data record, comprising:

reading an unverified data record;

providing a reference data file containing reference data records, the reference data records being associated with verified data records;

comparing the unverified data record with the reference data records to identify a matching reference data record;

reading the matching reference data record to identify a matching verified data record; and outputting the matching verified data record; and the reference data file further including unverified reference data records, the unverified reference data records not being associated with a matching verified data record;

further including comparing the unverified data record with the reference data records to identify unmatched unverified data records, the unmatched unverified data records being unverified data records that do not have a matching reference data record;

further including the step of generating an unverified reference data record in the reference data file that matches each unmatched unverified data record; and further including the step of generating an exception report for each unverified reference data record; and wherein the unverified data record further includes at least one identifier field, the at least one identifier field containing identifier data.

8. The method of claim 7, wherein the step of comparing the unverified data record with the reference data records to identify a matching reference data record further includes:

reading the reference data records, the reference data records each including at least one identifier field that contains identifier data;

comparing the identifier data in the reference data records with the identifier data in the unverified data record; and identifying a matching reference data record, the matching reference data record including at least one identifier field that contains identifier data that matches the identifier data in the unverified data record.

9. The method of claim 8, wherein the identifier data represents at least one of the group consisting of a broker dealer number, a branch number, and a sales representative number.

10. A method of verifying a data record, comprising:

reading an unverified data record;

providing a reference data file containing reference data records, the reference data records being associated with verified data records;

comparing the unverified data record with the reference data records to identify a matching reference data record;

reading the matching reference data record to identify a matching verified data record; and outputting the matching verified data record; and the reference data file further including unverified reference data records, the unverified reference data records not being associated with a matching verified data record;

further including comparing the unverified data record with the reference data records to identify unmatched unverified data records, the unmatched unverified data records being unverified data records that do not have a matching reference data record;

further including the step of generating an unverified reference data record in the reference data file that matches each unmatched unverified data record; and further including the step of generating an exception report for each unverified reference data record; and further including the step of manually obtaining correct identifier data for an unverified reference data record that does not have a watching verified data record, and creating a matching verified data record for the unverified reference data record in the reference data file using the correct identifier data.

11. The method of claim 10, wherein the step of manually obtaining correct identifier data for an unverified reference data record, further includes:

selecting a database maintenance form that includes data record identifier fields;

manually inputting the correct identifier data for the unverified reference data record into the data record identifier fields on the database maintenance form; and creating the matching verified data record by verifying the correct identifier data on the database maintenance form.

12. The method of claim 1, wherein the comparing the unverified data record with the reference data records to identify a matching reference data record is performed by a data record comparison portion.

13. The method of claim 12, wherein the data record comparison portion is disposed in a computer operating system.

* * * * *

UNITED STATES PATENT AND TRADEMARK OFFICE
CERTIFICATE OF CORRECTION

| | | |
|---|---|---|
| PATENT NO. | : 6,745,211 B2 | Page 1 of 1 |
| APPLICATION NO. | : 09/683121 | |
| DATED | : June 1, 2004 | |
| INVENTOR(S) | : Gregory J. Kabasakalian et al. | |

It is certified that error appears in the above-identified patent and that said Letters Patent is hereby corrected as shown below:

Col. 13, Line 31, In claim 1, line 1, "or" should be --of--;
Col. 14, Line 65, In claim 5, line 6, "computing" should be --comparing--;
Col. 15, Line 12, line 20, "marching" should be --matching--;
Col, 15, Line 14, line 22, "chat" should be --that--;
Col. 16, Line 40, In claim 10, line 28, "watching" should be --matching--; and
In column 7, line 17, "records"s" should be --records's--.

Signed and Sealed this

Twenty-second Day of August, 2006

JON W. DUDAS
*Director of the United States Patent and Trademark Office*